United States Patent
Kim et al.

(10) Patent No.: US 8,498,256 B2
(45) Date of Patent: Jul. 30, 2013

(54) METHOD FOR ALLOCATING RESOURCES FOR EDGE-USERS USING COOPERATIVE MIMO

(75) Inventors: Sun Nam Kim, Gyeonggi-do (KR); Jae Wan Kim, Gyeonggi-do (KR); Dong Guk Lim, Gyeonggi-do (KR); Bin Chul Ihm, Gyeonggi-do (KR); Ja Ho Koo, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 223 days.

(21) Appl. No.: 12/990,762

(22) PCT Filed: Apr. 30, 2009

(86) PCT No.: PCT/KR2009/002292
§ 371 (c)(1),
(2), (4) Date: Jan. 14, 2011

(87) PCT Pub. No.: WO2009/134093
PCT Pub. Date: Nov. 5, 2009

(65) Prior Publication Data
US 2011/0103339 A1 May 5, 2011

Related U.S. Application Data

(60) Provisional application No. 61/049,778, filed on May 2, 2008.

(30) Foreign Application Priority Data

Jun. 26, 2008 (KR) .................. 10-2008-0060851

(51) Int. Cl.
*H04W 4/00* (2009.01)
*H04W 28/04* (2009.01)

(52) U.S. Cl.
CPC .................... *H04W 28/04* (2013.01)
USPC .......................... 370/329; 455/447

(58) Field of Classification Search
CPC ..................................... H04W 28/04
USPC ............... 370/203–208, 328–334, 338–347; 455/7, 447, 522
See application file for complete search history.

(56) References Cited

U.S. PATENT DOCUMENTS

| | | | |
|---|---|---|---|
| 2004/0225740 A1 | 11/2004 | Klemba et al. | |
| 2006/0146856 A1* | 7/2006 | Jung et al. | 370/431 |
| 2008/0101287 A1 | 5/2008 | Kim et al. | |
| 2009/0225706 A1* | 9/2009 | Ramachandran et al. | 370/329 |
| 2009/0233544 A1* | 9/2009 | Oyman et al. | 455/7 |

FOREIGN PATENT DOCUMENTS

WO   WO 02/15613   2/2002

* cited by examiner

*Primary Examiner* — Kan Yuen
(74) *Attorney, Agent, or Firm* — Morgan, Lewis & Bockius LLP

(57) ABSTRACT

A method for allocating fractional frequency reuse (FER) resources to perform cooperative MIMO in a multi-cell environment is disclosed. A cell which requests FER resources decides a band for cooperative MIMO with its neighboring cell, and requests the neighboring cell to allocate the decided band for cooperative MIMO. A cell which receives FER resource request receives a request from a neighboring cell to allocate some or all of FER bands allocated to the neighboring cell as a band for cooperative MIMO, decides whether to grant the request, and allocates some or all of the requested FER bands as the band for cooperative MIMO with the neighboring cell if the request is granted.

3 Claims, 3 Drawing Sheets

METHOD FOR ALLOCATING RESOURCES FOR EDGE-USERS USING COOPERATIVE MIMO

The present application is a national stage of PCT International Application No. PCT/KR2009/002292, filed Apr. 30, 2009, and claims the benefit of U.S. Provisional Application No. 61/049,778, filed May 2, 2008. The present national stage application also claims the benefit of Korean Patent Application No. 10-2008-0060851, filed Jun. 26, 2008.

TECHNICAL FIELD

The present invention relates to a broadband wireless mobile communication system, and more particularly, to a method for allocating resources for edge-users who use cooperative multiple input multiple output (MIMO) based on a multi-cell.

BACKGROUND ART

Frequency reuse is one of methods for increasing channels per unit area in a cellular system. The intensity of an electric wave becomes weak gradually as the distance becomes long. Accordingly, since there is little interference between electric waves in a place away from a given distance, a single frequency channel can be used therein. In this way, one frequency can be used simultaneously in various zones. This could increase subscriber capacity. Efficient use of the frequency will be referred to as frequency reuse. A unit for dividing zones from one another will be referred to as a cell (mobile communication cell), and frequency channel conversion between cells for maintaining communication will be referred to as hand-off. In an analog cellular mobile communication system, the frequency reuse technique is necessarily required. Namely, although the frequency reuse technique is used in an FDMA or a TDMA, since a total of cells use the same frequency in a CDMA, frequency reuse is not required. Accordingly, in this case, a frequency reuse coefficient or a frequency reuse rate is 1. The frequency reuse rate means one of parameters representing how frequency efficiency is in a cellular system, etc. The frequency reuse rate is a value obtained by dividing the number of cells (sectors) which simultaneously use the same frequency channel in a multi-cell structure by a total number of cells (sectors) of the multi-cell structure.

A frequency reuse rate of a 1 G system (for example, AMPS) is smaller than 1. For example, for 7-cell frequency reuse, a frequency reuse rate is $1/7$. A frequency reuse rate of a 2 G system (for example, CDMA and TDMA) has been more improved than that of the 1 G system. For example, in a GSM where FDMA and TDMA are used in combination, a frequency reuse rate reaches $1/4$ to $1/3$. In case of a 2 G CDMA system and a 3 G WCDMA system, since a frequency reuse rate can reach 1, spectral efficiency is increased and the network arrangement cost is reduced.

When all sectors within one cell and all cells within one network use the same frequency channel, a frequency reuse rate of 1 can be obtained. However, obtaining a frequency reuse of 1 in a cellular network means that edge users of cells have signal receiving throughput reduced by interference from neighboring cells.

Since a center region of the cell is close to a base station, it is safe from co-channel interference from neighboring cells. Accordingly, inner users in the center of the cell can use all possible sub-channels. However, users in the edge of the cell can use only a part of all possible sub-channels. In the edge of neighboring cells, a frequency is allocated in such a manner that respective cells use different sub-channels. This is called fractional frequency reuse (FFR).

In an OFDMA, since a channel is divided into sub-channels, a signal is transmitted on the sub-channels, and all channels are not used unlike 3 G (CDMA2000 or WCDMA). The FER scheme uses these features of the OFDMA. The FER maximizes frequency efficiency for users located in the center of the cell and improves throughput and signal intensity for users located in the edge of the cell (cell boundary).

As compared with a network where the same transmission power is used for all subchannels, sub-channels of high power and sub-channels of low power are used in combination to increase total coverage of the network. The base station can transmit data to short-distance subscribers using some sub-channels having low transmission power. The other sub-channels can be used with higher transmission power, and can be used for long-distance subscribers and short-distance subscribers. In order to minimize interference for subscribers of neighboring base stations, two neighboring cells can be configured in such a manner that high power is not equally allocated to same sub-channels. In this way, cell edge mobile stations can be used with low power by neighboring sectors, or can be scheduled by high power tone which is not used by neighboring sectors. According to this approach, all base stations use frequency bandwidths using different power levels on different sub-channels. Some tones are used by all sectors, and thus have a reuse rate of 1. On the other hand, since the other tones are used by only $1/3$ of the sectors, the tones have a reuse rate of $1/3$.

Examples of the FER scheme include a hard FER scheme and a soft FER scheme. In the soft FER scheme, some tones are used with low power. By contrast, in the hard FER scheme, some tones are not used at all.

Meanwhile, in a network according to the related art, communication has been directly performed between the base station and a receiver in all cases of downlink and uplink. On the other hand, a relay is additionally provided in a relay network. The relay reduces dependence on the base station. If the relay is used with reducing the number of base stations, the network cost can be reduced.

In a cooperative MIMO relaying network, a virtual antenna array is formed, and the relay is used to retransmit a signal transmitted from the base station in case of a downlink.

Cooperative MIMO has been developed from the cooperative relay technique. In cooperative relay, the relay should necessarily have the capability of decoding a received signal. The relay determines a transmission type in cooperation with the base station or other relays to provide the most excellent channel status to subscribers after decoding the received signal. If this relay is used, it is possible to increase cell capacity as well as cell coverage corresponding to the advantage of the relay.

Furthermore, in MIMO spatial multiplexing (SM), better throughput is obtained if correlation between values within a channel characteristic matrix formed among a plurality of antennas is low. Namely, if transmitting antennas are far away from one another and receiving antennas are also far away from one another, a good channel characteristic matrix is formed. According to this principle, if transmitting antennas are located in different places (for example, base station and relay), a good channel characteristic matrix is formed, whereby characteristics of MIMO SM can be maximized. In the MIMO system, if the antennas are far away from one another, it is preferable to improve diversity gain using the plurality of antennas as well as SM characteristics. In a multi-cell environment, neighboring cells of edge users located in the edge of the cell can perform cooperative MIMO.

In the hard FER scheme, among all possible FER bands, a FER band to which is not allocated to a cell is not used by a mobile station within the cell, whereby resource efficiency is deteriorated. Also, in the soft FER scheme, some regions are allocated to a user within a cell using low power to improve resource efficiency. In this case, an efficient method is required to perform cooperative MIMO having more excellent throughput.

DISCLOSURE OF INVENTION

Technical Problem

An object of the present invention is to provide a method for performing cooperative MIMO to improve throughput of cell edge users in a multi-cell environment.

Another object of the present invention is to provide a method for using cooperative MIMO between base stations to improve resource efficiency of a FER scheme in a multi-cell environment.

Technical Solution

In order to solve the above technical problems, according to one aspect of the present invention, a method for allocating resources in a network of a wireless communication system comprises selecting a band for cooperative multiple input multiple output (MIMO) with a neighboring cell adjacent to a serving cell with respect to all or some of fractional frequency reuse (FER) bands allocated to the serving cell; and requesting the neighboring cell to allocate the selected band for cooperative MIMO.

The serving cell means a cell to which a served mobile station belongs. For example, in FIG. 2, a serving cell of a mobile station MSd means a cell that includes a base station D, a serving cell of a mobile station MSa means a cell that includes a base station A, and a serving cell of a mobile station MSc1 and MSc2 means a cell that includes a base station C.

The selected band for cooperative MIMO is used for a mobile station in the edge of the serving cell to transmit and receive a stream of a first packet, and among the FER bands allocated to the serving cell, some or all of the FER bands except for the selected band for cooperative MIMO are used for the mobile station to transmit and receive a stream of a second packet. The modulation coding schemes (MSC) and ranks of the stream of the first packet the stream of the second packet can be different from those of the stream of the second packet. Also, among all possible FER resources, some or all of the FER bands except for the FER band allocated to the serving cell and the FER band allocated as the band for cooperative MIMO with the neighboring cell can be allocated for users within the serving cell.

The step of selecting the band for cooperative MIMO is performed based on an information value of a channel fed back by a mobile station located in the serving cell.

The information value of the channel includes an information value of a first channel established between a base station of the serving cell and the mobile station located in the edge of the serving cell; and an information value of at least one or more second channels established between a base station of the neighboring cell which performs cooperative MIMO with the serving cell and the mobile station located in the edge of the serving cell.

Also, the information value of all channels established between the base station of the serving cell and the base station of the neighboring cell which performs cooperative MIMO with the serving cell can include an average value of information values of all channels, and an offset value of the information values of all channels with respect to the average value.

Also, the information value of all channels established between a base station of the serving cell and the base station of the neighboring cell which performs cooperative MIMO with the serving cell can include an information value of a channel established with the base station of the serving cell, and an offset value of an information value of each of all channels established with the base station of the neighboring cell, which performs cooperative MIMO with the serving cell, with respect to the information value of the channel established with the base station of the serving cell.

Also, the information value of the channel includes an information value of a channel established with the base station of the serving cell, and an information value of an equivalent channel of all channels established with the base station of the neighboring cell, which performs cooperative MIMO with the serving cell. Also, the information value of a channel established with the base station of the serving cell and the information value of an equivalent channel of all channels established with the base station of the neighboring cell, which performs cooperative MIMO with the serving cell, can include an average value of information values of a channel established with the base station of the serving cell and all channels established with the base station of the neighboring cell, and an offset value of information values of a channel established with the base station of the serving cell and all channels established with the base station of the neighboring cell, with respect to the average value.

Also, the information value of a channel established with the base station of the serving cell and the information value of an equivalent channel of all channels established with the base station of the neighboring cell, which performs cooperative MIMO with the serving cell, can include an information value of a channel established with the base station of the serving cell, and an offset value of the information value of the equivalent channel with respect to the information value of the channel established with the base station of the serving cell. Also, the information value of the channel can include an information value of a channel established with the base station of the serving cell and an equivalent channel of all channels established with the base station of the neighboring cell, which performs cooperative MIMO with the serving cell.

Also, the information value of the channel can further include an information value of a channel established with a base station of a candidate neighboring cell that can perform cooperative MIMO with the serving cell. This information value may be quantized value.

In another aspect of the present invention, a method for allocating resources in a network of a wireless communication system comprises receiving a request from a neighboring cell adjacent to a serving cell to allocate some or all of FER bands allocated to the neighboring cell as a band for cooperative MIMO; deciding whether to grant the received request; and allocating some or all of the FER bands allocated to the neighboring cell as the band for cooperative MIMO with the neighboring cell if the request is granted.

At this time, among all possible FER resources, some or all of the FER bands except for the FER band allocated to the serving cell and the FER band allocated as the band for cooperative MIMO with the neighboring cell can be allocated for users within the serving cell.

Advantageous Effects

According to the present invention, receiving throughput of a user located in the edge of a cell in a multi-cell environment can be improved. Also, the base stations can be allocated with same resources within FER band by a method previously scheduled among them, and an unreserved region within the FER band can be used for cooperative MIMO. Also, resources for cooperative MIMO can be allocated to cell edge users, and at the same time FER scheme can be used. When the FER scheme is used, application of soft FER for not reducing resource use efficiency can easily be performed.

BEST MODE FOR CARRYING OUT THE INVENTION

Figure 1:
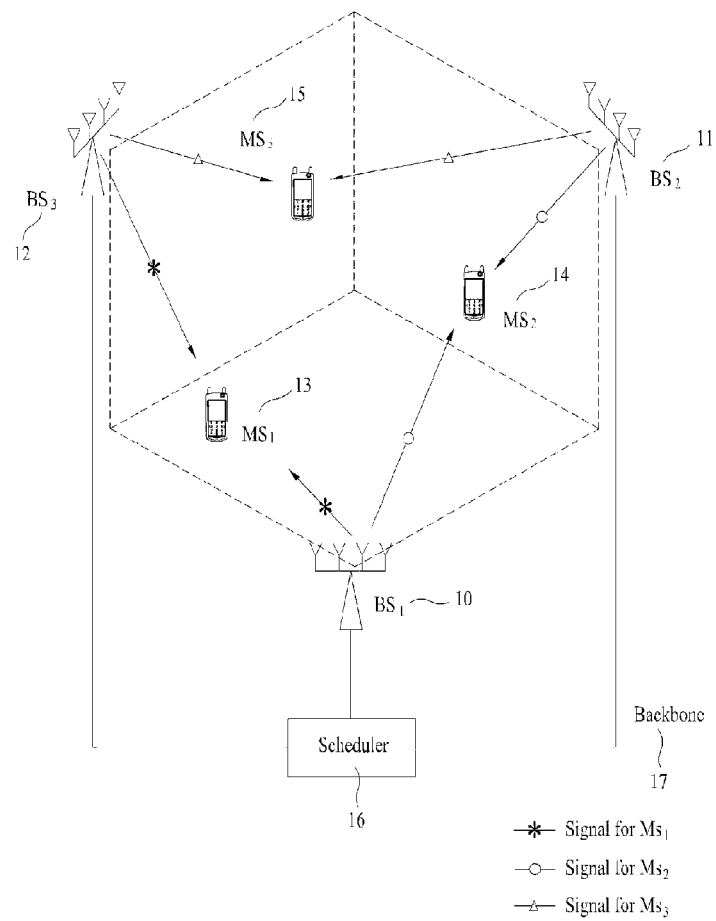
FIG. 1 is a diagram illustrating a method for transmitting and receiving a signal in a communication system to which a cooperative multiple input multiple output (MIMO) system is applied in a multi-cell environment.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. Hereinafter, the following detailed description includes detailed matters to provide full understanding of the present invention. However, it will be apparent to those skilled in the art that the present invention can be carried out without the detailed matters. For example, although the following description will be made based on some terminologies, the following description will not be limited to such terminologies and other terminologies may be designated as same meaning.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Hereinafter, a multiple input multiple out (MIMO) system and a cooperative MIMO system will be described in brief.

The MIMO system can improve spectral efficiency in proportional to the number of antennas, which could not be obtained in a single input single output (SIS) system according to the related art.

The MIMO technique means a multi-antenna technique where communication is performed at high speed using a plurality of antennas. The MIMO technique can be divided into a spatial multiplexing scheme and a spatial diversity scheme in accordance with data transmission.

The spatial multiplexing scheme is to transmit different data through a plurality of transmitting and receiving antennas. Namely, a transmitter transmits different data through each transmitting antenna, and a receiver improves a transmission rate as much as the number of transmitting antennas by classifying transmission data through proper interference removal and signal processing.

The spatial diversity scheme is to obtain transmission diversity by transmitting same data through multi-transmitting antennas. Namely, the spatial diversity scheme is a kind of a space time channel coding scheme. The spatial diversity scheme can maximize transmission diversity gain (throughput gain) by transmitting same data from multi-transmitting antennas. However, the spatial diversity scheme is intended not to improve a transmission rate but to improve reliability of transmission in accordance with diversity gain.

Also, the MIMO technique can be divided into an open loop mode (for example, BLAST, STTC, etc) and a closed loop mode (for example, TxAA, etc) in accordance with feedback of channel information from the receiver to the transmitter.

The cooperative MIMO system is suggested to reduce inter-cell interference in a multi-cell environment. If the cooperative MIMO system is used, a mobile station can receive data in common from multi-cell base stations. Also, each base station can support one or more mobile stations ($MS_1$, $MS_2$, . . . , $MS_K$) using the same radio frequency resource to improve system throughput. Also, the base station can perform a space division multiple access (SDMA) mode based on status information of a channel between the base station and the mobile station.

In the cooperative MIMO system, a serving base station and one or more cooperative base stations are connected with a scheduler through a backbone network. The scheduler can be operated in such a manner that channel information is fed back to the scheduler through the backbone network, wherein the channel information is measured by each of the base stations ($BS_1$, $BS_2$, . . . , $BS_M$) and relates to channel status between each of the mobile stations ($MS_1$, $MS_2$, . . . , $MS_K$) and the cooperative base station. For example, the scheduler schedules information for cooperative MIMO operation with respect to the serving base station and one or more cooperative base stations. Namely, the scheduler directly commands cooperative MIMO operation to each base station.

Each mobile station which uses cooperative MIMO reports information required for cooperative MIMO operation to each serving base station but does not report the information to the cooperative base stations. The serving base station transmits feedback information to the scheduler through the backbone network, and the scheduler provides the information for cooperative MIMO to the cooperative base stations through the backbone network.

FIG. 1 is a diagram illustrating a method for transmitting and receiving a signal in a communication system to which a cooperative multiple input multiple output (MIMO) system is applied in a multi-cell environment.

Referring to FIG. 1, unlike diversity, single-user MIMO and multi-user MIMO, which are performed by MIMO of a single cell unit according to the related art, MIMO can be performed in a multi-cell environment using a plurality of base stations.

Referring to FIG. 1, it is noted that a mobile station (MS1) 13 receives signals from a base station (BS1) 10 and a base station (BS3) 12, a mobile station (MS2) 14 receives signals from the base station (BS1) 10 and a base station (BS2) 11, and a mobile station (MS3) 15 receives signals from the base station (BS2) 11 and the base station (BS3) 12. Data transmitted from the plurality of base stations to the mobile station are configured by a scheduler 16 considering the plurality of base stations and then transferred to each base station through a backbone network 17.

At this time, the signals received from each base station may be equal to one another or different from one another. If the same data is received from each base station, diversity gain can be obtained. If different data are received from each base station, data transmission speed, i.e., data throughput can be enhanced.

In the same manner that the mobile station improves receiving throughput using single-user MIMO or multi-user MIMO through a multi-antenna of the same cell base station, the mobile station can perform diversity, single-user MIMO or multi-user MIMO by receiving the same channel signal from the base stations located in a plurality of neighboring cells. Particularly, the mobile station located in the cell edge which is likely to be affected by neighboring cells could perform diversity, single-user MIMO or multi-user MIMO by receiving the same channel signal from neighboring base stations using conversely the fact that the mobile station is located in the cell edge which is likely to be affected by neighboring cells.

Since a plurality of independent streams are transmitted to several mobile stations or a specific mobile station, when cooperative MIMO is used to perform single-user MIMO or multi-user MIMO, the plurality of base stations can receive channel status information (CSI) from the mobile station and perform channel estimation using the CSI. Each base station can independently generate an antenna weight value based on the channel estimated result, perform precoding for the generated antenna weight, and transmit the precoded result.

Figure 2:
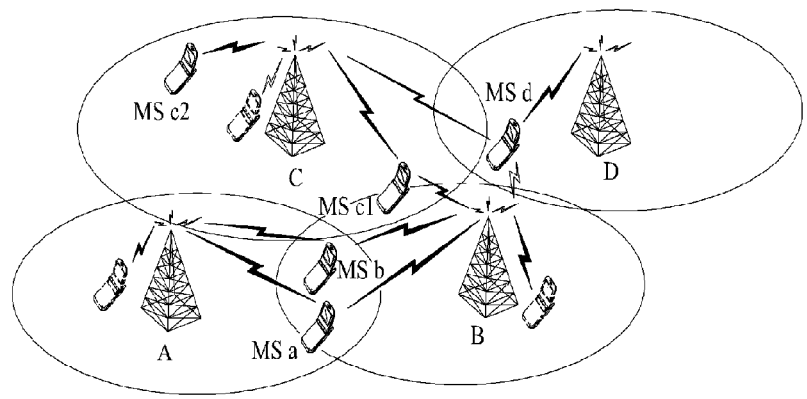
FIG. 2 is a diagram illustrating an operation of cooperative MIMO in a multi-cell environment.

FIG. 2 is a diagram illustrating an operation of cooperative MIMO in a multi-cell environment. Referring to FIG. 2, a plurality of mobile stations are arranged within a plurality of cells.

In FIG. 2, a mobile station MSa belongs to the edge of a cell A and is served by the cell A. However, since the mobile station MSa also belongs to the edge of a cell B, the mobile station MSa may be affected by the cell B. Likewise, a mobile station MSb belongs to the edge of the cell B and is served by the cell B. However, since the mobile station MSb also belongs to the edge of the cell A, the mobile station MSb may be affected by the cell A. Also, a mobile station MSc1 belongs to the edge of the cell C and is served by the cell C. However, since the mobile station MSc1 also belongs to the edge of the cell B, the mobile station MSc1 may be affected by the cell B. Since a mobile station MSc2 is located outside the cell A, the cell B and the cell D, the mobile station MSc2 may not be affected by the cell A, the cell B and the cell D. A mobile station MSd belongs to the edge of the cell D and is served by the cell DB. However, since the mobile station MSd also belongs to the edges of the cell B and the cell C, the mobile station MSd may be affected by the cell B and the cell C.

Figure 3:
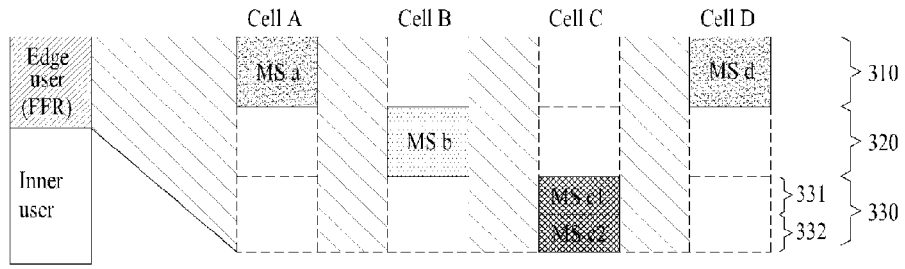
FIG. 3 is a diagram illustrating an example that resources of a fractional frequency reuse band are allocated to a plurality of cells and a plurality of mobile stations illustrated in FIG. 2.

FIG. 3 is a diagram illustrating an example that resources of a fractional frequency reuse (FFR) band are allocated to a plurality of cells and a plurality of mobile stations illustrated in FIG. 2. For example, as illustrated in FIG. 3, the FER band for edge user (edge mobile station) located in the edge of the cell can be allocated to each cell at a reuse rate which is previously defined. In FIG. 2, some region of the cell A is overlapped with some regions of the cell B and the cell C. Accordingly, as illustrated in FIG. 3, the FER band 310 allocated to the cell A may not be used in the cell B and/or the cell C. Likewise, since some region of the cell B is overlapped with some regions of the cell A, the cell C and the cell D in FIG. 2, as illustrated in FIG. 3, the FER band 320 allocated to the cell B may not be used in the cell A, the cell C and/or the cell D. Likewise, since some region of the cell C is overlapped with some regions of the cell A, the cell B and the cell D in FIG. 2, as illustrated in FIG. 3, the FER bands 331 and 332 allocated to the cell C may not be used in the cell A, the cell B and/or the cell D. Likewise, since some region of the cell D is overlapped with some regions of the cell B and the cell C in FIG. 2, as illustrated in FIG. 3, the FER band 310 allocated to the cell D may not be used in the cell B and/or the cell C. Also, since the cell A is not overlapped with the cell D in FIG. 2, the same FER band 310 may be allocated to the cell A and the cell D.

As illustrated in FIG. 3, the mobile station MSa located in the edge of the cell A can be allocated with all of the FER band 310 allocated to the cell A. Likewise, the mobile station MSb located in the edge of the cell B can be allocated with all of the FER band 320 allocated to the cell B. Likewise, the mobile station MSd located in the edge of the cell D can be allocated with all of the FER band 310 allocated to the cell D. Meanwhile, in FIG. 2, the edge mobile station MSc1 and the edge mobile station MSc2 exist in the cell C. Accordingly, the edge mobile station MSc1 and the edge mobile station MSc2 of the cell C can respectively be allocated with the FER band 331 and the FER band 332 of the FER band 330 allocated to the cell C.

Referring to FIG. 2 and FIG. 3, if the mobile stations located in the edge of the cell intend to perform cooperative MIMO, the base station to be cooperated with the mobile stations can be identified from FIG. 2. For example, if the mobile station MSa served from the cell A performs cooperative MIMO, the base station of the cell B that may affect the mobile station MSa will be the cooperative base station. Likewise, if the mobile station MSb served from the cell B performs cooperative MIMO, the base station of the cell A that may affect the mobile station MSb will be the cooperative base station. Likewise, if the mobile station MSd served from the cell D performs cooperative MIMO, the base station of the cell B and/or the cell C that may affect the mobile station MSd will be the cooperative base station.

Figure 4:
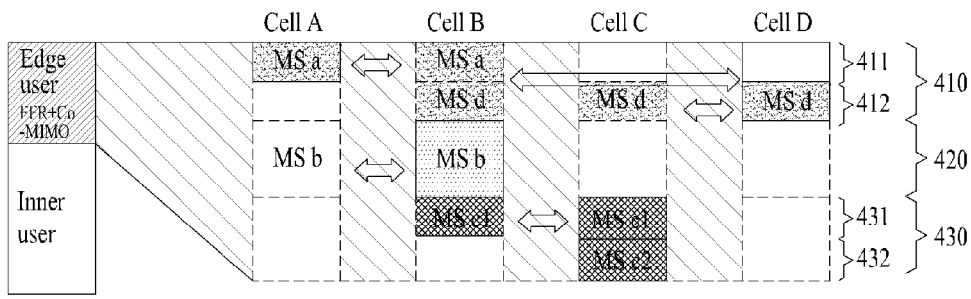
FIG. 4 is a diagram illustrating an example of resource allocation for performing cooperative MIMO among multi-cells in accordance with one embodiment of the present invention.

FIG. 4 is a diagram illustrating an example of resource allocation for performing cooperative MIMO among multi-cells in accordance with one embodiment of the present invention.

Referring to FIG. 4, in order to perform cooperative MIMO for the edge mobile station MSa, FER band 411 can be allocated to the cell A and the cell B. Likewise, in order to perform cooperative MIMO for the edge mobile station MSb, FER band 420 can be allocated to the cell A and the cell B. Likewise, in order to perform cooperative MIMO for the edge mobile station MSc1, FER band 431 can be allocated to the cell B and the cell C. Also, in order to perform cooperative MIMO for the edge mobile station MSd, FER band 412 can be allocated to the cell B, the cell C and the cell D.

In this case, referring to FIG. 2, the mobile station MSc2 served by the cell C is located in a position where the mobile station MSc2 is not affected by any other cell. Accordingly, the cell A, the cell B, and/or the cell D cannot perform cooperative MIMO for the mobile station MSc2, and the cell A, the cell B and/or the cell D cannot allocate the FER band 432.

In the embodiment according to FIG. 4, the FER band according to the related art is used. The embodiment according to FIG. 4 has several advantages. Each base station of each cell uses a local mode and a distributed mode for random regions to improve receiving throughput of the mobile stations. Namely, regions for the local mode and the distributed mode can be allocated randomly. Since these regions can be set differently for each base station, application of cooperative MIMO where same resources are allocated is limited. However, if regions, such as FER band, to which the local mode and the distributed mode are allocated, are scheduled between the respective base stations, the problem that the regions are allocated randomly can be solved. Also, according to the configuration of FIG. 3, an unreserved region to which a frequency band is not allocated exists to avoid interference between neighboring cells. Accordingly, it is not desirable in view of resource efficiency. However, referring to FIG. 4, since the unreserved region can be used for cooperative MIMO, resource efficiency can be improved. Also, in case of soft FER, it is determined which one of a case where an inner user uses a tone region of low power and a case where cooperative MIMO is used has better throughput than any other one, by using feedback channel information, thereby improving entire throughput. This method can be extended to a case where the FER is not used. For example, the mobile station determines which one of the cases is more advantageous than any other one based on feedback information, thereby determining whether cooperative MIMO will be used.

Figure 5:
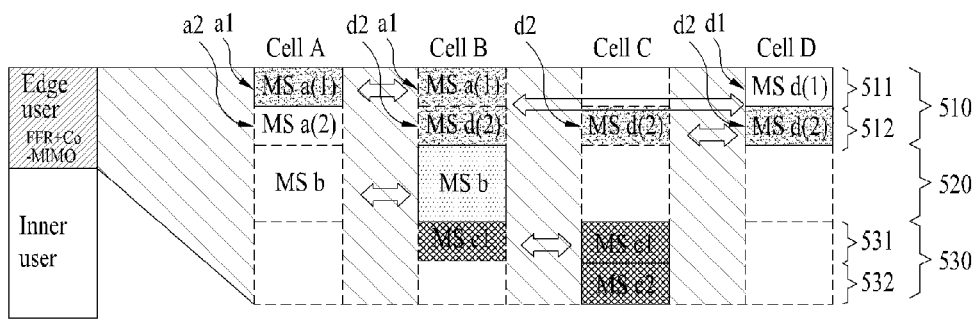
FIG. 5 is a diagram illustrating a method for splitting a FER region allocated to a serving base station into a region for performing cooperative MIMO and a region not used for cooperative MIMO in accordance with one embodiment of the present invention.

Meanwhile, for resource allocation for the mobile station MSa and the mobile station MSd, resource allocation of FIG. 3 can be compared with that of FIG. 4. Referring to FIG. 3, the mobile station MSa uses the entire of the FER band 310 allocated to the cell A. However, referring to FIG. 4, it is noted that the mobile station MSa uses only ½ of the FER band 310 allocated to the cell A. Namely, in case of resource allocation of the cell A, in the method according to FIG. 4, among the possible FER band, a band smaller than the band allocated to the cell A is used as compared with the method of FIG. 3. Accordingly, according to the method of FIG. 4, it is noted that efficiency of resource use is reduced in the cell A. FIG. 5 is a diagram illustrating a method for extending a size of a frequency band allocated to a mobile station in the method for allocating resources as illustrated in FIG. 4.

FIG. 5 is a diagram illustrating a method for splitting a FER region allocated to a serving base station into a region for performing cooperative MIMO and a region not used for cooperative MIMO in accordance with one embodiment of the present invention.

For example, in FIG. 4, despite that the FER band 412 is allocated for the cell A, the FER band 412 is not used for the mobile station MSa. Namely, the FER band 412 cannot perform cooperative MIMO for the mobile station MSa. Likewise, despite that the FER band 411 is allocated for the cell D in FIG. 4, the FER band 411 is not used for the mobile station MSd. Namely, the FER band 411 cannot perform cooperative MIMO for the mobile station MSd.

Referring to FIG. 5, in the cell A, FER band 512 is allocated for the mobile station MSa, and packet a2 transmitted through FER band 512 may be different from packet a1 transmitted through the FER band 511. The packet a1 and the packet a2 can use different modulation coding schemes (MCS) and ranks. Likewise, in the cell D, the FER band 511 is allocated for the mobile station MSd, and packet d1 transmitted through the FER band 511 may be different from packet d2 transmitted through the FER band 512. The packet d1 and the packet d2 can use different modulation coding schemes (MCS) and ranks.

As described above, among all possible FER bands, FER bands other than FER bands for edge users allocated to a specific cell may be allocated for cooperative MIMO with neighboring cells, or may be allocated for soft FER scheme where resources are allocated for users existing in the inner region other than the edge region. In this way, resource allocation through cooperative MIMO can be performed for users in the cell edge, and the FER scheme can be maintained. Also, when the FER scheme is used, application of soft FER for not reducing resource efficiency can easily be performed. At this time, if resources are used for inner users of the cells, a method of limiting a precoding matrix index (PMI) used in each cell, for example, a method of using the second best PMI not the best PMI may be used to minimize inter-cell interference.

Resource allocation for cooperative MIMO can be performed by a method of transmitting and receiving a request signal and a grant signal among base stations of a plurality of cells. Namely, the first base station can transmit a request signal to the second base station to request resource allocation for cooperative MIMO. If the second base station grants the request, the second base station can transmit the grant signal to the first base station. By contrast, if the second base station does not grant the request, the second base station may transmit a non-grant message to the first base station or may not transmit any message.

In this way, the cooperative MIMO operation can be performed without any assistance of additional controller connected with the base station through the backbone network. This will be described in more detail with reference to FIG. 6 and FIG. 7.

Meanwhile, a random cell can request its neighboring cell to allocate a specific resource for cooperative MIMO. At this time, the specific resource can be determined based on channel information fed back from the mobile station in the cell. For example, in FIG. 2, the base station of the cell A can determine the FER band to be used for cooperative MIMO based on information such as CSI/CQI/SINR transmitted from the mobile station MSa within the cell A. The cell A can request its neighboring cell (for example, cell B) to allocate the determined band for cooperative MIMO. There may be several methods for feeding the channel information back.

First, the edge mobile station within the serving cell can respectively transmit information of a channel established with the serving base station (home base station) of the serving cell and information of all channels established with a base station of a neighboring cell, which performs cooperative MIMO with the serving cell, to the base station of the serving cell. At this time, in order to reduce overhead caused by the amount of the information, the following methods can be used. First of all, information values of the above channels can include an average value of information values of all channels, and an offset value of the information values of the respective channels with respect to the average value. Alternatively, the information values of the above channels can include an information value of a channel established with the base station of the serving cell and an offset value of an information value of each of all channels established with the base station of the neighboring cell, which performs cooperative MIMO with the serving cell, with respect to the information value of the channel established with the base station of the serving cell.

Second, the edge mobile station within the serving cell can transmit the information value of the channel established with the serving base station of the serving cell and an equivalent information value of all channels established with the base station of the neighboring cell, which perform cooperative MIMO with the serving cell, to the base station of the serving cell. At this time, the information value of the channel established with the base station of the serving cell and the equivalent information value of all channels established with the base station of the neighboring cell, which perform cooperative MIMO with the serving cell, can include an average value of information values of the channel established with the base station of the serving cell and all channels established with the base station of the neighboring cell, and an offset value of the information values of the channel established with the base station of the serving cell and each of all channels established with the base station of the neighboring cell with respect to the average value. Alternatively, the information value of the channel established with the base station of the serving cell and the equivalent information value of all channels established with the base station of the neighboring cell, which performs cooperative MIMO with the serving cell, can include an information value of the channel established with the base station of the serving cell, and an offset value of the equivalent information value of all channels with respect to the information value of the channel established with the base station of the serving cell.

Third, the edge mobile station within the serving cell can transmit the information value of the channel established with the serving base station of the serving cell and the equivalent information value of all channels established with the base station of the neighboring cell, which performs cooperative MIMO with the serving cell, to the base station of the serving cell. At this time, in order to reduce transmission overhead, a method for transmitting an average value and an offset value from the average value can be considered.

Furthermore, the information value of the above channels can further include an information value of a channel established with a base station of a candidate neighboring cell that can perform cooperative MIMO with the serving cell. This information value may be a quantized value.

Figure 6:
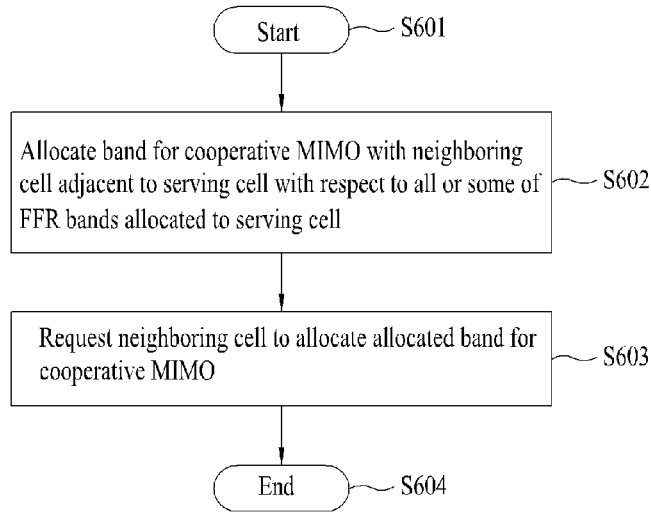
FIG. 6 is a diagram illustrating a request procedure of a cell base station to a base station of a neighboring cell to allocate a FER band for performing cooperative MIMO in accordance with one embodiment of the present invention.

FIG. 6 is a diagram illustrating a request procedure of a cell base station to a base station of a neighboring cell to allocate a FER band for performing cooperative MIMO in accordance with one embodiment of the present invention.

Referring to FIG. 6, the serving cell allocates a band for cooperative MIMO with a neighboring cell adjacent to the serving cell to all or some of the FER bands allocated to the serving cell (S602). In this case, the band for cooperative MIMO, which is allocated by the serving cell, is used for the mobile station located in the edge of the serving cell to transmit and receive a stream of a first packet, and some or all of the bands except for the band for cooperative MIMO among the FER bands allocated to the serving cell can be used for the above mobile station to transmit and receive a stream of a second packet different from the first packet. The stream of the first packet and the stream of the second packet can use different modulation and coding schemes and ranks. Then, the serving cell requests its neighboring cell to allocate the band, which is allocated by the serving cell, for cooperative MIMO (S603).

In this case, among all the possible FER resources, some or all of the FER bands except for the FER band allocated to the serving cell and the FER band allocated as the band for cooperative MIMO with the neighboring cell can be allocated for inner users within the serving cell. Also, the step of allocating the band for cooperative MIMO with the neighboring cell with respect to all or some of the FER bands allocated to the serving cell can be performed based on the information value of the channel fed back by the cell edge mobile station of the serving cell. In this case, although not illustrated in FIG. 6, the step of receiving feedback information of the information value of the channel from the cell edge mobile station of the serving cell can additionally be included before the step (S602).

The information value of the channel can include the information values of all channels established between the base station of the neighboring cell, which performs cooperative MIMO with the serving cell, and the base station of the serving cell. At this time, the information values of all channels can include an average value of the information values of all channels, and an offset value of the information values of all channels with respect to the average value. Alternatively, the information values of all channels can include an information value of a channel established with the base station of the serving cell, and an offset value of the information value of each of all channels established with the base station of the neighboring cell, which performs cooperative MIMO with the serving cell, with respect to the information value of the channel established with the base station of the serving cell.

Furthermore, the information value of the above channel can include the information value of the channel established with the base station of the serving cell, and the equivalent information value of all channels established with the base station of the neighboring cell, which performs cooperative MIMO with the serving cell. At this time, the information values of the above channels can include an average value of the information values of the channel established with the base station of the serving cell and all channels established with the base station of the neighboring cell, and an offset value of the information value of the channel established with the base station of the serving cell and the information value of each of all channels established with the base station of the neighboring cell with respect to the average value. Alternatively, the information values of the above channels can include the information value of the channel established with the base station of the serving cell, and an offset value of the information value of the channel equivalent to the information value of the channel established with the base station of the serving cell.

Furthermore, the information value of the above channel can include information values of channels equivalent to the channel established with the base station of the serving cell and all channels established with the base station of the neighboring cell, which performs cooperative MIMO with the serving cell.

Furthermore, the information value of the above channel can further include an information value of a channel established with a base station of a candidate neighboring cell that can perform cooperative MIMO with the serving cell. This information value may be a quantized value.

Figure 7:
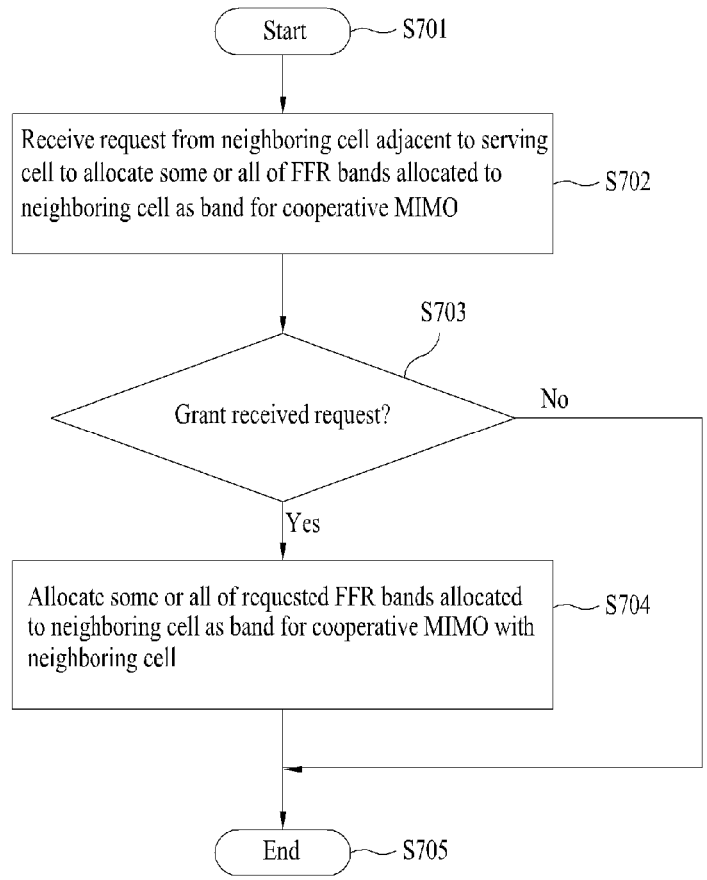
FIG. 7 is a diagram illustrating a procedure of performing a request when a cell base station is requested from a base station of a neighboring cell to allocate a FER band for performing cooperative MIMO in accordance with one embodiment of the present invention.

FIG. 7 is a diagram illustrating a procedure of performing a request when a cell base station is requested from a base station of a neighboring cell to allocate a FER band for performing cooperative MIMO in accordance with one embodiment of the present invention.

Referring to FIG. 7, the serving cell receives a request from a neighboring cell adjacent to the serving cell to allocate all or some of the FER bands as a band for cooperative MIMO (S702). Then, the serving cell decides whether or not to grant the received request (S703). If the serving cell does not grant the request, the serving cell can transmit a NACK response to the request, or can end the request without transmitting the NACK response. By contrast, if the serving cell decides to grant the request, the serving cell can allocate some or all of the requested FER bands allocated to the neighboring cell as the band for cooperative MIMO with the neighboring cell (S704).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on data transmission and reception between the base station and the mobile station. In this case, the base station means a terminal node of a network, which performs direct communication with the mobile station. A specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The base station may be replaced with terms such as a fixed station, Node B, eNode B (eNB), and access point. Also, the mobile station may be replaced with terms such as user equipment (UE) and mobile subscriber station (MSS).

The embodiments according to the present invention may be implemented by various means, for example, hardware, firmware, software, or their combination.

If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of transmitting and receiving data in the wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be used in a network of a broadband wireless mobile communication system, which uses cooperative MIMO and FER scheme.

The invention claimed is:

1. A method for allocating resources in a network of a wireless communication system, the method comprising:
    selecting a band for cooperative multiple input multiple output (MIMO) with a neighboring cell adjacent to a serving cell with respect to all or some of fractional frequency reuse bands allocated to the serving cell; and
    requesting the neighboring cell to allocate the selected band for cooperative MIMO,
    wherein the selected band for cooperative MIMO is used for a mobile station in the edge of the serving cell to transmit and receive a stream of a first packet, and some or all of the fractional frequency reuse bands allocated to the serving cell except the selected band for cooperative MIMO are used for the mobile station to transmit and receive a stream of a second packet, and
    wherein modulation coding schemes (MCS) and ranks of the stream of the first packet is different from those of the stream of the second packet.

2. A method for allocating resources in a network of a wireless communication system, the method comprising:
    receiving a request from a neighboring cell adjacent to a serving cell to allocate some or all of fractional frequency reuse bands allocated to the neighboring cell as a band for cooperative multiple input multiple output (MIMO); and
    allocating some or all of the fractional frequency reuse bands allocated to the neighboring cell as the band for cooperative MIMO with the neighboring cell when the request is granted,
    wherein the band for cooperative MIMO is selected based on an information value of a channel fed back by a mobile station located in an edge of the serving cell, and
    wherein the information value of the channel includes:
        an information value of a first channel established between a base station of the serving cell and the mobile station located in the edge of the serving cell; and
        an offset value of an information value of at least one or more second channels established between a base station of the neighboring cell, which performs cooperative MIMO with the serving cell, and the mobile station located in the edge of the serving cell with respect to the information value of the first channel.

3. The method of claim 1 wherein, among all possible fractional frequency reuse resources, some or all of the fractional frequency reuse bands except a fractional frequency reuse band allocated to the serving cell and a fractional frequency reuse band selected for the serving cell as the band for cooperative MIMO with the neighboring cell are allocated for users within the serving cell.

\* \* \* \* \*